(12) United States Patent
Blackburn

(10) Patent No.: US 7,302,893 B2
(45) Date of Patent: Dec. 4, 2007

(54) GAS GENERATOR WITH ALIGNMENT MECHANISM

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 194 days.

(21) Appl. No.: 11/260,052

(22) Filed: Oct. 27, 2005

(65) Prior Publication Data

US 2006/0207468 A1 Sep. 21, 2006

Related U.S. Application Data

(60) Provisional application No. 60/622,821, filed on Oct. 28, 2004.

(51) Int. Cl.
*B60R 21/26* (2006.01)
(52) U.S. Cl. .................... 102/530; 280/741
(58) Field of Classification Search ............... 102/530; 280/736–741
See application file for complete search history.

(56) References Cited

U.S. PATENT DOCUMENTS

| | | | | |
|---|---|---|---|---|
| 5,628,528 A | * | 5/1997 | DeSautelle et al. | ......... 280/736 |
| 5,834,682 A | * | 11/1998 | Warren | ......... 102/439 |
| 7,073,820 B2 | * | 7/2006 | McCormick | ......... 280/741 |
| 2005/0134031 A1 | * | 6/2005 | McCormick | ......... 280/741 |
| 2006/0005734 A1 | * | 1/2006 | McCormick | ......... 102/530 |
| 2006/0043716 A1 | * | 3/2006 | Quioc et al. | ......... 280/741 |

* cited by examiner

*Primary Examiner*—Troy Chambers
(74) *Attorney, Agent, or Firm*—L.C. Begin & Associates, PLLC

(57) ABSTRACT

A gas generating system (10) includes a housing (12) having a longitudinal axis (A) and a pair of baffle tubes (22, 24) positioned within the housing (12). The baffle tubes each have a pair of opposed ends. At least a pair of opposed longitudinally aligned surfaces (62, 64) is formed within the housing (12) proximate the ends of the housing. Each of the surfaces (62, 64) is sloped with respect to the housing longitudinal axis (A) and abuts a corresponding end of one of the baffle tubes (22, 24) to position the baffle tubes within the housing (12) such that longitudinal axes of the first baffle tube (22) and the second baffle tube (24) are both substantially coaxial with the longitudinal axis (A) of the housing (12). Abutment between the sloped surfaces (62, 64) and the baffle tubes (22, 24) during assembly of the gas generating system provides an efficient means of automatically centering the baffle tubes (22, 24) within the housing (12), thereby easing assembly of the gas generating system.

8 Claims, 2 Drawing Sheets

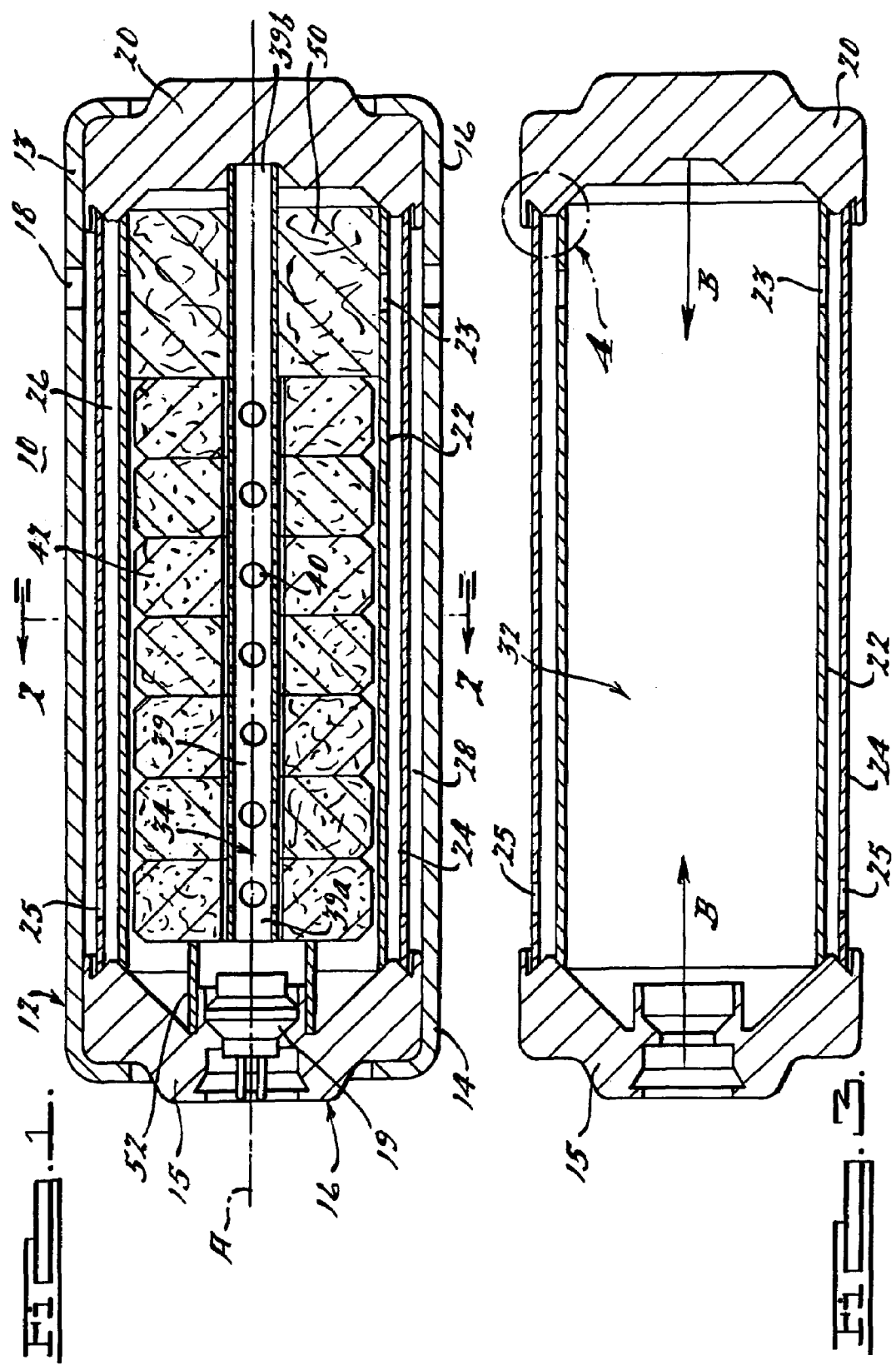

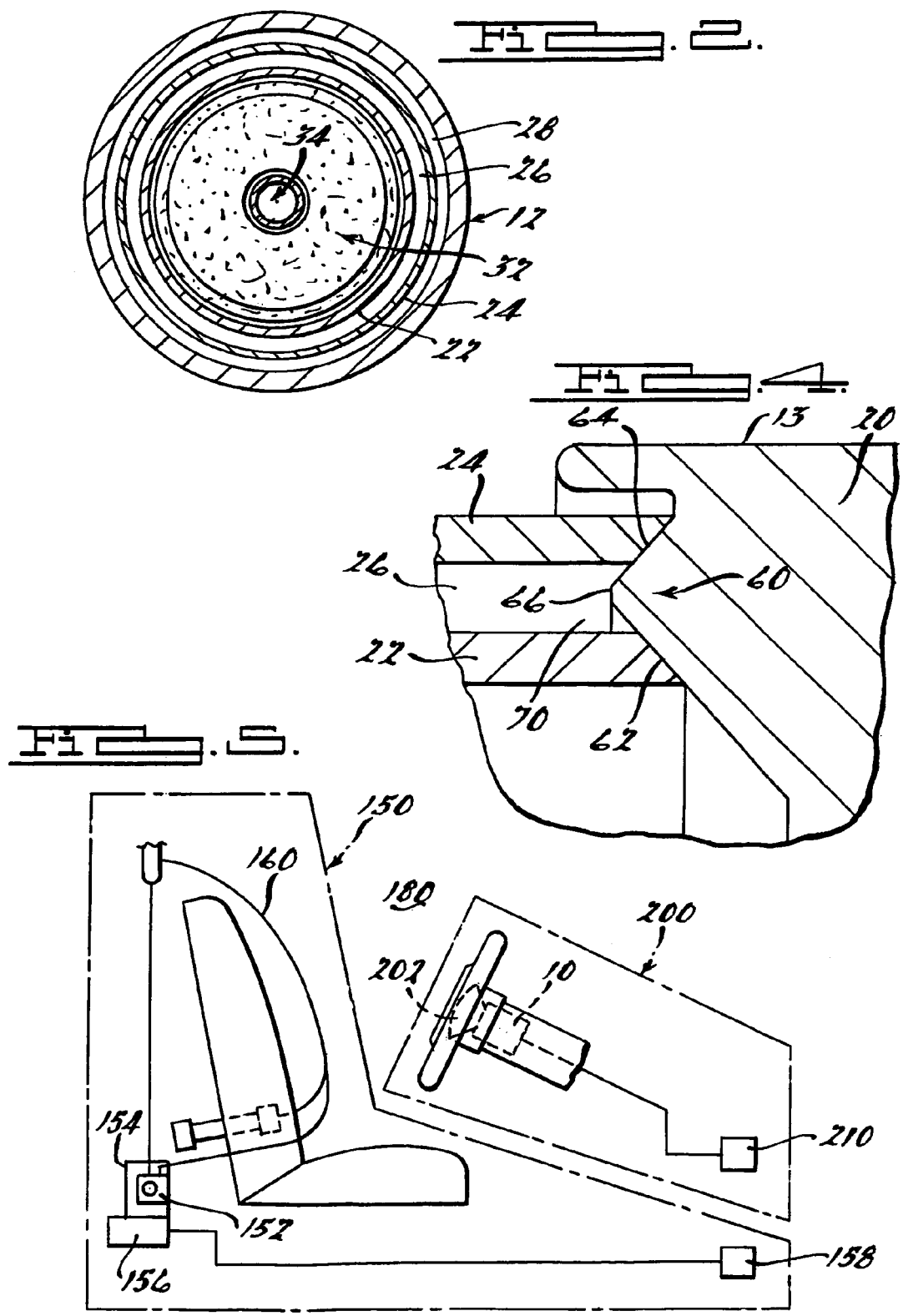

GAS GENERATOR WITH ALIGNMENT MECHANISM

CROSS REFERENCE TO RELATED APPLICATIONS

This application claims the benefit of provisional application Ser. No. 60/622,821, filed on Oct. 28, 2004.

BACKGROUND OF THE INVENTION

The present invention relates to gas generating systems and, more particularly, to a pyrotechnic gas generating system including a mechanism for aligning a plurality of concentric gas flow baffles incorporated therein.

Some gas generating system designs incorporate one or more concentric, tubular baffles positioned within the gas generator housing to direct the flow of gases within the housing prior to expulsion of the gases from the housing. The baffles, usually in conjunction with an outer wall of the gas generator housing, form one or more concentric annular flow passages for channeling gas flow within the housing. In many of these designs, it is important to maintain the concentricity of the baffles during the flow of gases therethrough, to control the dimensions of the gas flow passages formed along the baffles. Concentricity of the baffles is usually achieved and maintained by the use of shoulders or tabs positioned along end portions of the housing to engage end portions of the baffles in interference fits. However, positioning the baffles to engage the shoulders or tabs during assembly of the gas generating system may be time consuming, thereby increasing assembly time and manufacturing costs.

SUMMARY OF THE INVENTION

A gas generating system is provided including a housing having a longitudinal axis and a first baffle tube positioned within the housing. The first baffle tube has a pair of opposed ends. At least a first pair of opposed, longitudinally-aligned surfaces is formed within the housing. Each of the surfaces is sloped with respect to the longitudinal axis and abuts a corresponding end of the first baffle tube to position the first baffle tube within the housing such that a longitudinal axis of the first baffle tube is substantially coaxial with the longitudinal axis of the housing.

In another aspect of the invention, a baffle system is provided including a first tubular baffle member having a first longitudinal axis and a second tubular baffle member positioned within the first tubular baffle member to form a gas flow passage extending between the first baffle member and the second baffle member. A pair of opposed end members is also provided, each end member having at least one surface sloped with respect to the longitudinal axis and abutting an end of the first baffle member and at least one surface sloped with respect to the longitudinal axis and abutting an end of the second baffle member, such that a spacing between the first baffle member and the second baffle member is substantially constant over a length of the gas flow passage extending between the first and second baffle members.

In yet another aspect of the invention, a vehicle occupant protection system is provided including a gas generating system having a housing with a longitudinal axis. A first baffle tube is positioned within the housing. The first baffle tube has a pair of opposed ends. At least a first pair of opposed, longitudinally-aligned surfaces is formed within the housing. Each surface of the at least a first pair of surfaces is sloped with respect to the longitudinal axis and abuts a corresponding end of the first baffle tube to position the first baffle tube within the housing such that a longitudinal axis of the first baffle tube is substantially coaxial with the longitudinal axis of the housing.

BRIEF DESCRIPTION OF THE DRAWINGS

FIG. 1 is a cross-sectional side view of a gas generating system incorporating a baffle tube alignment mechanism in accordance with the present invention;

FIG. 2 is a cross-sectional end view taken along line 2-2 of FIG. 1 showing an axial arrangement of baffle tubes in accordance with the present invention;

FIG. 3 shows a cross-sectional side view of a baffle system in accordance with the present invention showing engagement between end caps and baffle tubes to center and position the baffle tubes;

FIG. 4 is a magnified view of the portion of FIG. 3 enclosed in the circle showing details of the end cap baffle tube alignment features; and FIG. 5 is a schematic representation of an exemplary vehicle occupant protection system incorporating a gas generating system in accordance with the present invention.

DETAILED DESCRIPTION

FIGS. 1-4 show one embodiment of a gas generating system 10 incorporating a mechanism for aligning a plurality of concentric gas flow baffles incorporated therein, in accordance with the present invention. Referring to FIGS. 1-4, gas generating system 10 includes an elongate, substantially cylindrical housing 12 having a first end 14 and a second end 16. A plurality of gas discharge apertures 18 are spaced circumferentially along housing 12 to enable fluid communication between an interior of the housing and an exterior of the housing, the exterior of the housing being in fluid communication with an airbag (not shown) or other inflatable element of, for example, a vehicle occupant protection system. Housing 12 also has a longitudinal central axis A, an outer wall 13, and openings formed at both ends of housing 12. Housing 12 may be stamped, extruded, die cast, or otherwise metal formed and may be made from carbon steel or stainless steel, for example.

A pair of concentrically arranged baffle tubes 22, 24 are positioned and secured within housing 12, preferably centered about housing longitudinal axis A. Referring to FIGS. 1 and 2, baffle tubes 22, 24 form, in conjunction with housing 12, a series of annular passages 26, 28 through which combustion gases propagate from a combustion chamber 32 (formed in an interior of inner baffle tube 22) to discharge apertures 18. As is known in the art, baffle passages 26, 28 are designed to cool the combustion products and to reduce or eliminate flaming of the combustion products prior to the products exiting the gas generating system through apertures 18. A plurality of gas discharge apertures 23 are spaced circumferentially around an end portion of inner baffle tube 22 to enable fluid communication between an interior of baffle tube 22 and passage 26. Similarly, a plurality of gas discharge apertures 25 is spaced circumferentially around an end portion of baffle tube 24 to enable fluid communication between passage 26 and passage 28.

Referring to FIGS. 1 and 3, a pair of end caps 15, 20 is secured at respective first and second ends of housing 12 to seal the openings provided in the housing. End caps 15, 20 may be stamped, extruded, die cast, or otherwise metal formed and may be made from carbon steel or stainless steel, for example. End caps 15, 20 may be crimped, welded or clamped to housing 12 in a manner sufficient to ensure a gas tight seal between end caps 15, 20 and housing 12. In the embodiment shown in FIGS. 1-4, end portions of housing 12 are crimped over shoulders formed in end caps 15, 20. When assembled as shown in FIGS. 1 and 3, an axis extending through a center portion of end cap 15 is substantially coaxial with housing axis A.

Similarly, an axis extending through a center portion of end cap 20 is substantially coaxial with housing axis A An igniter 19 is secured to the housing so as to enable fluid communication between the igniter and a gas generant composition 42 (described below) positioned in the housing, upon activation of the gas generating system. In the embodiment shown, igniter 19 is incorporated into an igniter end cap assembly 16 that includes an igniter 19 and end cap 15. Igniter end cap assembly 16 is positioned and secured along central axis A to seal an end opening provided in housing 12, as previously described. Igniter 19 may be formed as known in the art. One exemplary igniter construction is described in U.S. Pat. No. 6,009,809, herein incorporated by reference.

Referring again to FIG. 1, an elongated propagation tube 34 is provided for channeling combustion products formed by ignition of igniter 18 down the length of combustion chamber 32, thereby facilitating longitudinal propagation of combustion of gas generant 42. Propagation tube 34 has an elongate, substantially cylindrical body 39 defining a first end 39a, a second end 39b, and an interior cavity. Propagation tube 34 also includes a plurality of apertures 40 substantially evenly-spaced along a length thereof to enable fluid communication between igniter combustion products flowing along tube 34 and gas generant composition 42 positioned in combustion chamber 32. In the embodiment shown, gas generant 42 is in the form of a plurality of annular wafers stacked along tube 34 to substantially enclose tube 34 along a portion of its length. It will be appreciated that other, alternative arrangements of the gas generant composition may be used. For example, combustion chamber 32 may be partially or completely filled with a gas generant in granulated or tablet form. In addition, apertures 40 may vary in number or arrangement from those shown in FIG. 1. Propagation tube 34 may, for example, be extruded or roll formed from sheet metal and then perforated. Propagation tube 34 is positioned within housing 12 to extend along central axis A of the housing. First end 39a is positioned to enable fluid communication between the igniter and the interior cavity of the propagation tube. Second end 39b is secured within a cavity formed in second end cap 20. The elongate shape of tube 34 provides for combustion of gas generant 42 that propagates substantially from tube first end 39a toward tube second end 39b.

Gas generant compositions suitable for use in the present invention are disclosed, for example, in Applicant's co-pending U.S. patent application Ser. No. 09/664,130, incorporated herein by reference. Other exemplary gas generants that are contemplated as useful include, but are not limited to, those described in U.S. Pat. Nos. 5,035,757, 6,210,505, and 5,872,329, each incorporated herein by reference.

Referring to FIG. 1, a filter 50 may be incorporated into the gas generating system design for filtering particulates from gases generated by combustion of gas generant 42. In general, filter 50 is positioned at an end of combustion chamber 32, proximate second end cap 20. Filter 50 may be formed from one of a variety of materials (for example, compressed wire or a carbon fiber mesh or sheet) known in the art for filtering gas generant combustion products.

Referring again to FIG. 1, a cup 52 coupled to propagation tube 34 encloses igniter 19 to define a fluid-tight interior portion of the cup in communication with igniter 19 and the interior cavity of tube 34. During activation of gas generating system 10, cup 52 can accommodate a resident interim gas pressure, facilitating ignition of gas generant 42. A quantity of booster propellant (not shown) may also be positioned in the cup interior portion to facilitate combustion of gas generant 42, in a manner known in the art. Cup 52 may be formed separately or integral with propagation tube 34, and may be stamped, extruded, die cast, or otherwise metal formed and may be made from carbon steel or stainless steel, for example.

In accordance with the present invention, a baffle alignment mechanism is provided for the centering and relative spacing of baffle tubes 22 and 24. Referring to FIGS. 1, 3 and 4, in one embodiment the baffle alignment mechanism comprises an annular ridge 60 formed along an interior surface of each of end caps 15 and 20. Each ridge 60 has a pair of annular surfaces 62, 64 which are sloped with respect to axis A and which intersect at a peak 66. Ridges 60 perform the function of positioning baffle tubes 22 and 24 substantially coaxially with axis A during assembly of the gas generating system. Specifically, when baffle tubes 22 and 24 are positioned to enclose propagation tube 34, gas generant 42, and filter 50, end caps 15 and 20 are positioned abutting respective ends of the baffle tubes such that peaks 66 extend into an annular gap 70 formed between baffle tubes 22 and 24. As end caps 15 and 20 are inserted into opposite ends of housing 13, the housing also provides and maintains substantially coaxial alignment of end caps 15 and 20. Then, as end caps 15 and 20 are moved toward each other in the directions indicated by arrows B, respective end portions of baffle tubes 22 and 24 slide along sloped surfaces 62 and 64 (FIG. 4), baffle tube 24 sliding along surfaces 64 and baffle tube 24 sliding along surfaces 62. Baffle tubes 22 and 24 slide along respective sloped surfaces 62 and 64 until an equilibrium position along surfaces 62 and 64 is reached by the end portions of each baffle tube (that is, until further movement of end caps 15 and 20 in the direction of arrow B is prohibited.) At this point, end caps 15 and 20 are substantially coaxially aligned along axis A and the radial spacing between inner baffle tube 22 and outer baffle tube 24 is substantially constant along the extent of annular passage 26. Because end caps 15 and 20 are substantially coaxially aligned by housing 13, insertion of the endcaps into the housing in the directions indicated by arrows B positions baffle tubes 22 and 24 substantially coaxially within housing 13. In this respect, ridges 60 enable baffle tubes 22 and 24 to be "self-centering" or "self-aligning" during assembly of the gas generating system. End portions of housing 12 are then crimped over end caps 15 and 20 to maintain the baffle tubes in their substantially coaxial positions. In this respect, ridges 60 act to center and maintain baffle tubes 22 and 24 within housing 12 and with respect to each other prior to and during activation of gas generating system 10. Similarly, with end portions of housing 12 crimped over end caps 15 and 20, ridges 60 act to position outer baffle tube 24 with respect to outer wall 13 of housing 12, and the radial spacing between outer baffle tube 22 and housing outer wall 13 is substantially constant along the extent of annular passage 28.

Sloped annular surfaces 62 are formed along end caps 15 and 20 so as to be in an opposed relationship with each other when end caps 15 and 20 are positioned and secured within housing 13. Similarly, sloped annular surfaces 64 are formed along end caps 15 and 20 so as to be in an opposed relationship and axially aligned with each other when end caps 15 and 20 are positioned and secured within housing 13.

In the embodiment shown in FIGS. 1-4, ridges 60 including surfaces 62 and 64 are annular ridges. Alternatively, the ridges may be in the form of discontinuous arcuate sections formed in a circular pattern, or in the form of non-arcuate ridged sections formed into a pattern having a shape corresponding to the cross-sections of corresponding end portions of the baffle (or baffles) which abut the ridges when the gas generating system is assembled.

Operation of the gas generating system will now be discussed. Upon receipt of a signal from a crash sensor, an electrical activation signal is sent to igniter 19, thereby activating the igniter. Cup 52 channels a flow of combustion products from the igniter to propagation tube first end 39a. As igniter combustion products progress from tube first end 39a toward tube second end 39b, apertures 40 in tube 34 facilitate expulsion of combustion gases into combustion chamber 32, thereby igniting gas generant 42. Gas generant combustion products proceed toward housing second end 16, passing through filter 50 and out of baffle tube apertures 23, entering annular passage 26 formed between baffle tubes 22 and 24. The combustion products then proceed down the length of passage 26, exiting tube 22 at apertures 25 formed in baffle tube 24 and entering passage 28 extending between tube 24 and housing wall 13. The combustion products then flow along the length of baffle tube 24, exiting housing 12 through housing apertures 18.

It may be seen from the above description that the annular ridge 60 formed along each of end caps 15 and 20 provides centering of and desired spacing between baffle tubes 22 and 24 during assembly of the gas generating system. Ridges 60 also maintain the centering of and desired spacing between baffle tubes 22 and 24 during operation of the gas generating system. This is especially important in applications where the size of the annular gap separating the baffle tubes and/or the size of the annular gap separating a baffle tube and the housing wall are critical to proper operation of the gas generating system.

The embodiment shown in FIGS. 1-4 show two baffle tubes 22 and 24 incorporated into the gas generating system. Alternatively, either a single baffle tube or more than two baffle tubes may be incorporated into the gas generating system. The number of annular sloped surfaces formed along end caps 15 and 20 would be decreased or increased accordingly, with a pair of opposed, annular sloped surfaces provided for aligning a corresponding one of each baffle tubes incorporated into the gas generating system.

Referring to FIG. 5, in a particular application, a gas generating system including an embodiment of the baffle alignment mechanism described above is incorporated into an airbag system 200. Airbag system 200 includes at least one airbag 202 and a gas generating system 10 as described herein coupled to the airbag so as to enable fluid communication with an interior of the airbag upon activation of the gas generating system. Airbag system 200 may also be in communication with a known crash event sensor 210 that is in operative communication with a known crash sensor algorithm (not shown) which signals actuation of airbag system 200 via, for example, activation of igniter 19 (not shown in FIG. 5) in the event of a collision.

Referring again to FIG. 5, an embodiment of the gas generating system or an airbag system including an embodiment of the gas generating system may be incorporated into a broader, more comprehensive vehicle occupant protection system 180 including additional elements such as a safety belt assembly. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
   a housing having a longitudinal axis;
   a first baffle tube positioned within the housing, the first baffle tube having a pair of opposed ends; and
   at least a first pair of opposed surfaces formed within the housing, each surface of the at least a first pair of surfaces being sloped with respect to the longitudinal axis and abutting a corresponding end of the first baffle tube to position the first baffle tube within the housing such that a longitudinal axis of the first baffle tube is substantially coaxial with the longitudinal axis of the housing.

2. The gas generating system of claim 1 wherein each surface of the at least a first pair of surfaces is an annular surface, and wherein each of the annular surfaces has a central axis extending substantially coaxially with the housing longitudinal axis.

3. The gas generating system of claim 1 wherein the housing has an outer wall,
   a gas flow passage is formed between the first baffle tube and the outer wall,
   and wherein each surface of the at least a first pair of surfaces is sloped with respect to the longitudinal axis and abuts a corresponding end of the first baffle tube to position the baffle tube within the housing such that
   a spacing between the first baffle tube and the housing outer wall is substantially constant over a length of the gas flow passage.

4. The gas generating system of claim 1 further comprising a second baffle tube positioned within the first baffle tube, and at least a second pair of opposed surfaces, each surface of the at least a second pair of surfaces being sloped with respect to the longitudinal axis and abutting a corresponding end of the second baffle tube to position the second baffle tube within the housing such that a longitudinal axis of the second baffle tube is substantially coaxial with the longitudinal axis of the housing.

5. The gas generating system of claim 4 wherein a gas flow passage is formed between the first baffle tube and the second baffle tube, and wherein a spacing between the first baffle tube and the second baffle tube is substantially constant along a length of the gas flow passage.

6. The gas generating system of claim 1 further comprising a first endcap for sealing a first end of the housing and a second endcap for sealing a second end of the housing, and wherein one surface of the at least a first pair of surfaces is formed along the first endcap and another surface of the at least a first pair of surfaces is formed along the second endcap.

7. A baffle system comprising:
  a first tubular baffle member having a first longitudinal axis;
  a second tubular baffle member positioned within the first tubular baffle member to form a gas flow passage extending between the first baffle member and the second baffle member; and
  a pair of opposed end members, each end member of the pair of end members having at least one surface sloped with respect to the longitudinal axis and abutting an end of the first baffle member and at least one surface sloped with respect to the longitudinal axis and abutting an end of the second baffle member, such that a spacing between the first baffle member and the second baffle member is substantially constant over a length of the gas flow passage extending between the first and second baffle members.

8. A vehicle occupant protection system comprising a gas generating system having a housing with a longitudinal axis, a first baffle tube positioned within the housing, the first baffle tube having a pair of opposed ends, and at least a first pair of opposed surfaces formed within the housing, each surface of the at least a first pair of surfaces being sloped with respect to the longitudinal axis and abutting a corresponding end of the first baffle tube to position the first baffle tube within the housing such that a longitudinal axis of the first baffle tube is substantially coaxial with the longitudinal axis of the housing.

* * * * *